United States Patent
Harada et al.

(10) Patent No.: US 12,250,649 B2
(45) Date of Patent: Mar. 11, 2025

(54) TERMINAL AND BASE STATION FOR SYNCHRONIZATION SIGNAL BLOCK TRANSMISSION BASED ON AN ODD/EVEN SYSTEM FRAME NUMBER (SFN) CONFIGURATION

(71) Applicant: NTT DOCOMO, INC., Tokyo (JP)

(72) Inventors: Hiroki Harada, Tokyo (JP); Satoshi Nagata, Tokyo (JP); Jing Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 350 days.

(21) Appl. No.: 17/791,098

(22) PCT Filed: Jan. 31, 2020

(86) PCT No.: PCT/JP2020/003833
§ 371 (c)(1),
(2) Date: Jul. 6, 2022

(87) PCT Pub. No.: WO2021/152863
PCT Pub. Date: Aug. 5, 2021

(65) Prior Publication Data
US 2023/0029702 A1    Feb. 2, 2023

(51) Int. Cl.
*H04W 56/00* (2009.01)
*H04L 5/00* (2006.01)
(Continued)

(52) U.S. Cl.
CPC .......... *H04W 56/001* (2013.01); *H04L 5/0051* (2013.01); *H04W 36/0007* (2018.08);
(Continued)

(58) Field of Classification Search
CPC ............ H04W 72/30; H04W 36/0007; H04W 52/001; H04W 72/52; H04W 72/04; H04W 36/22; H04L 29/08459; H04L 67/1076
See application file for complete search history.

(56) References Cited

U.S. PATENT DOCUMENTS

| | | | |
|---|---|---|---|
| 2020/0008247 A1* | 1/2020 | Kwak | H04B 7/0695 |
| 2020/0015197 A1 | 1/2020 | Harada et al. | |

(Continued)

FOREIGN PATENT DOCUMENTS

| | | |
|---|---|---|
| JP | 2019-534591 A | 11/2019 |
| WO | 2018143399 A1 | 8/2018 |
| WO | 2018172842 A2 | 9/2018 |

OTHER PUBLICATIONS

Kryukov, Yakov, Pokamestov, Dmitriy, and Rogozhnikov, Eugeniy. "Cell search and synchronization in 5G NR." ITM Web of Conferences. vol. 30. EDP Sciences, 2019. pp. 1-4 (Year: 2019).*

(Continued)

*Primary Examiner* — Salvador E Rivas
(74) *Attorney, Agent, or Firm* — Osha Bergman Watanabe & Burton LLP

(57) ABSTRACT

A terminal includes a reception unit that receives a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that identifies, based on the received synchronization signal block, an index of a candidate position for a transmission corresponding to the received synchronization signal block, from among candidate positions for transmitting a synchronization signal (Continued)

block, the number of the candidate positions being greater than a predetermined number.

4 Claims, 11 Drawing Sheets

(51) Int. Cl.
  *H04W 36/00*   (2009.01)
  *H04W 72/30*   (2023.01)
  *H04L 67/1074* (2022.01)
  *H04W 36/22*   (2009.01)
  *H04W 72/04*   (2023.01)

(52) U.S. Cl.
  CPC ......... *H04W 72/30* (2023.01); *H04L 67/1076* (2013.01); *H04W 36/22* (2013.01); *H04W 72/04* (2013.01)

(56) References Cited

U.S. PATENT DOCUMENTS

| | | | |
|---|---|---|---|
| 2020/0154376 A1* | 5/2020 | Ko | H04W 72/30 |
| 2021/0185624 A1* | 6/2021 | Xu | H04L 27/2659 |
| 2021/0243706 A1* | 8/2021 | Liu | H04L 5/0007 |
| 2022/0263626 A1* | 8/2022 | Tian | H04L 5/0094 |

OTHER PUBLICATIONS

Office Action issued in counterpart Japanese Patent Application No. 2021-574433 mailed on Jan. 16, 2024 (5 pages).
International Search Report issued in PCT/JP2020/003833 on Sep. 1, 2020 (5 pages).
Written Opinion of the International Searching Authority issued in PCT/JP2020/003833 on Sep. 1, 2020 (3 pages).
Intel Corporation; "New SID: Study on supporting NR from 52.6GHz to 71 GHz"; 3GPP TSG RAN Meeting #86, RP-193259; Sitges, Spain; Dec. 9-12, 2019 (4 pages).
Qualcomm; "New WID on Extending current NR operation to 71 GHz"; 3GPP TSG RAN Meeting #86, RP-193229; Sitges, Spain; Dec. 9-12, 2019 (5 pages).
3GPP TS 38.101-2 V15.8.0 "3rd Generation Partnership Project; Technical Specification Group Radio Access Network; NR; User Equipment (UE) radio transmission and reception; Part 2: Range 2 Standalone (Release 15)" Dec. 2019 (144 pages).
Ericsson; "WF on the NR-U channel raster on 5GHz band"; 3GPP TSG-RAN4 Meeting #92bis, R4-1912870; Chongqing, China; Oct. 14-18, 2019 (10 pages).
Qualcomm Incorporated; "Draft CR channel raster in band n46 for NR-U operation"; 3GPP TSG-RAN WG4 #93, R4-1916167; Reno, United States; Nov. 18-22, 2019 (3 pages).
Qualcomm Incorporated; "WF for sync raster for NR-U"; 3GPP TSG-RAN WG4 Meeting #92bis, R4-1912982; Chongqing, China; Oct. 14-18, 2019 (4 pages).
Futurewei; "Draft CR for Sync raster design for NR-U in 38.104"; 3GPP TSG-RAN WG4 #93, R4-1915982; Reno, US; Nov. 18-22, 2019 (3 pages).
3GPP TS 38.331 V15.8.0 "3rd Generation Partnership Project; Technical Specification Group Radio Access Network; NR; Radio Resource Control (RRC) protocol specification (Release 15)" Dec. 2019 (532 pages).
3GPP TS 38.213 V15.8.0 "3rd Generation Partnership Project; Technical Specification Group Radio Access Network; NR; Physical layer procedures for control (Release 15)" Dec. 2019 (109 pages).
Office Action issued in counterpart Japanese Application No. 2021-574433, mailed Jun. 25, 2024 (5 pages).

\* cited by examiner

FIG.8

The scrambling sequence generator shall be initialized at the start of each SS/PBCH block occasion with $$c_{init} = 2^{11}(\bar{i}_{SSB}+1)(\lfloor N_{ID}^{cell}/4 \rfloor+1) + 2^6(\bar{i}_{SSB}+1) + (N_{ID}^{cell} \bmod 4)$$

where

- for $L_{max}=4$, $\bar{i}_{SSB} = i_{SSB} + 4n_{hf}$ where $n_{hf}$ is the number of the half-frame in which the PBCH is transmitted in a frame with $n_{hf}=0$ for the first half-frame in the frame and $n_{hf}=1$ for the second half-frame in the frame, and $i_{SSB}$ is the two least significant bits of the SS/PBCH block index as defined in [5, TS 38.213]

- for $L_{max}=8$ or $L_{max}=64$, $\bar{i}_{SSB} = i_{SSB}$ where $i_{SSB}$ is the three least significant bits of the SS/PBCH block index as defined in [5, TS 38.213]

e.g., four least significant bits

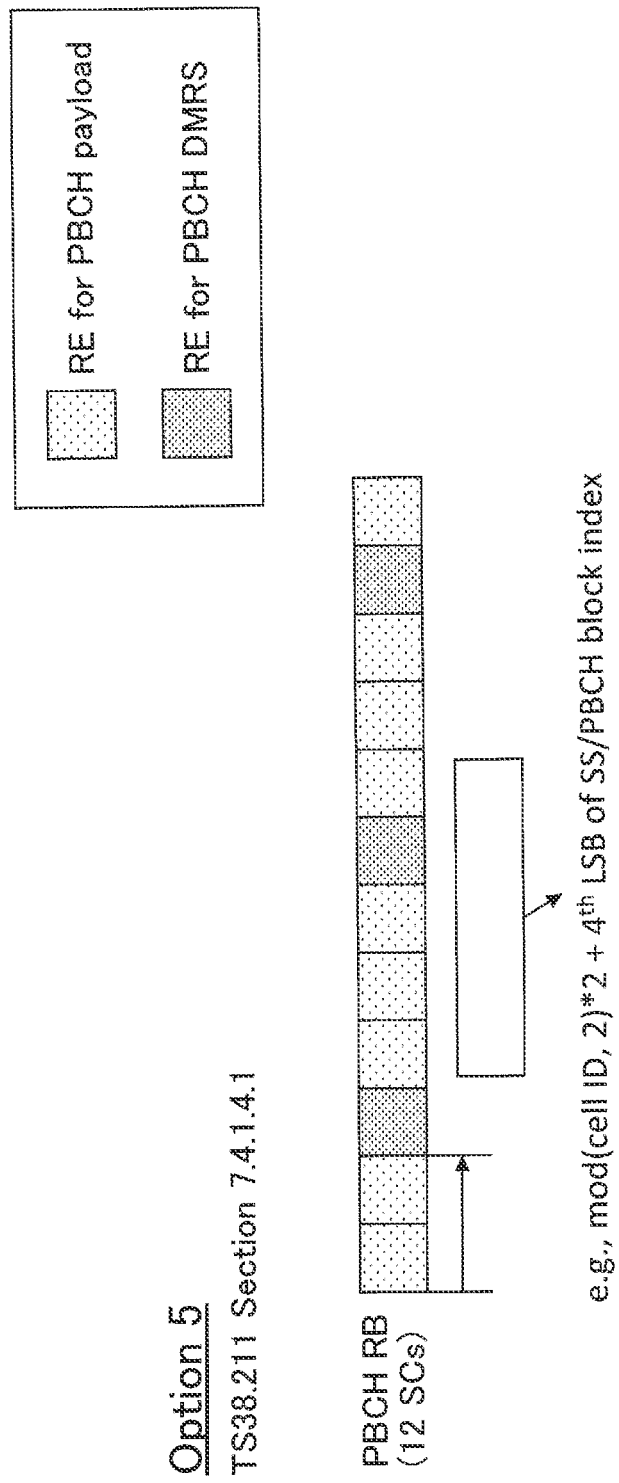

FIG.10

Option 6
TS38.211 Section 7.3.3.2
Rel-15: UE shall assume the block of bits are QPSK modulated ...

e.g., with phase offset $p = n*pi$, where n is $4^{th}$ LSB of SS/PBCH block index

TERMINAL AND BASE STATION FOR SYNCHRONIZATION SIGNAL BLOCK TRANSMISSION BASED ON AN ODD/EVEN SYSTEM FRAME NUMBER (SFN) CONFIGURATION

TECHNICAL FIELD

The present invention relates to a terminal and a base station in a radio communication system.

BACKGROUND ART

In new ratio (NR) of Release 15 and NR of Release 16 of a third generation partnership project (3GPP), a frequency band up to the upper limit of 52.6 GHz is the target. With regard to extension of NR to a frequency band higher than or equal to 52.6 GHz, in Release 16, a study item exists at a technical specification group radio access network (TSG RAN) level in which various regulations, use cases, requirements, and the like are to be studied. The study of the study item has been completed in December 2019, and in Release 17, a study item and a work item for actually extending a technical specification to 52.6 GHz or higher have been agreed.

In the study item in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz. In addition, when extending the NR frequency band from 52.6 GHz to 71 GHz, it is assumed that extension is carried out on the basis of design of current NR frequency range 2 (FR2).

RELATED ART DOCUMENT

Non-Patent Document

Non-Patent Document 1: 3GPP TSG RAN Meeting #86, RP-193229, Sitges, Spain, Dec. 9 to 12, 2019
Non-Patent Document 2: 3GPP TS 38.101-2 V15.8.0 (2019-12)
Non-Patent Document 3: 3GPP TSG-RAN4 Meeting #92bis, R4-1912870, Chongqing, China, 14 to 18 Oct. 2019
Non-Patent Document 4: 3GPP TSG-RAN4 Meeting #93, R4-1916167, Reno, United States, 18 to 22 Nov. 2019
Non-Patent Document 5: 3GPP TSG-RAN4 Meeting #92bis, R4-1912982, Chongqing, China, 14 to 18 Oct. 2019
Non-Patent Document 6: 3GPP TSG-RAN4 Meeting #93, R4-1915982, Reno, US, Nov. 18 to 22, 2019
Non-Patent Document 7: 3GPP TS 38.331 V15.8.0 (2019-12)
Non-Patent Document 8: 3GPP TS 38.213 V15.8.0 (2019-12)

SUMMARY OF THE INVENTION

Problem to be Solved by the Invention

A frequency band of 52.6 GHz to 71 GHz includes an unlicensed band of 60 GHz, and, thus, an extension of a function with respect to a licensed frequency band, and an extension of a function with respect to an unlicensed frequency may be necessary as an extension of a function for the frequency band from 52.6 GHz to 71 GHz.

There is a need for a technology that allows SSB transmission with efficiency and high reliability in a high frequency band higher than or equal to the frequency band of NR FR2, with a minimum change from an FR2 technical specification.

Means for Solving the Problem

According to an aspect of the present invention, there is provided a terminal including a reception unit that receives a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that identifies, based on the received synchronization signal block, an index of a candidate position for a transmission corresponding to the received synchronization signal block, from among candidate positions for transmitting a synchronization signal block, the number of the candidate positions being greater than a predetermined number.

Advantage of the Invention

According to an embodiment, there is provided a technology that allows an SSB transmission with efficiency and high reliability in a high frequency band higher than or equal to a frequency band of NR FR2, with a minimum change from an FR2 technical specification.

BRIEF DESCRIPTION OF DRAWINGS

FIG. 8 is a diagram illustrating an example of Option 4.
FIG. 9 is a diagram illustrating an example of Option 5.
FIG. 10 is a diagram illustrating an example of Option 6.

EMBODIMENTS OF THE INVENTION

Hereinafter, an embodiment of the invention will be described with reference to the accompanying drawings. Note that, the following embodiment is illustrative only, and embodiments to which the invention is applied are not limited to the following embodiments.

It is assumed that a radio communication system in the following embodiments basically conform to NR, but this is merely an example, and the radio communication system in the embodiments may partially or entirely conform to a radio communication system (for example, LTE) other than the NR.

(Overall System Configuration)

Figure 1:
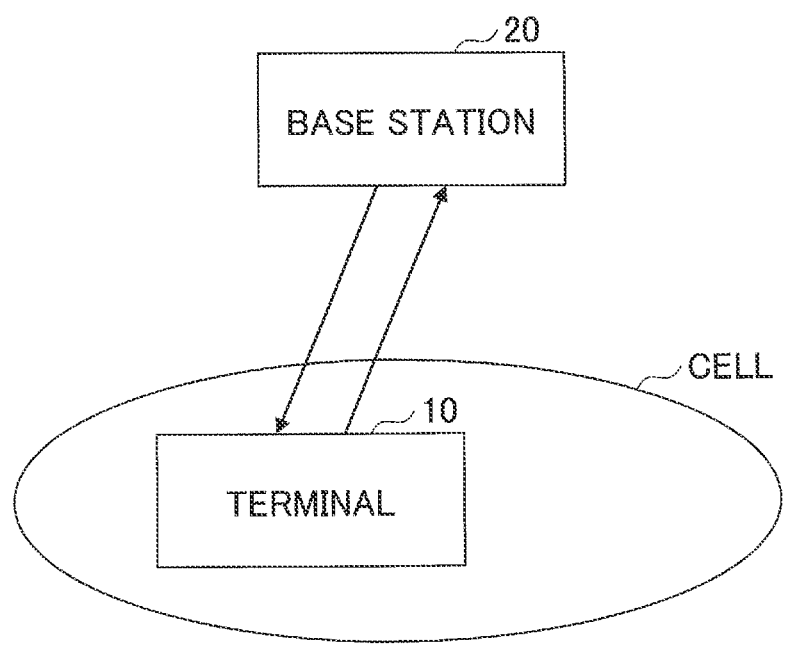
FIG. 1 is a configuration diagram of a communication system in an embodiment.

FIG. 1 illustrates a configuration diagram of the radio communication system according to the embodiments. As illustrated in FIG. 1, the radio communication system according to the embodiments includes a terminal 10 and a base station 20. In FIG. 1, one piece of the terminal 10 and one piece of the base station 20 are illustrated, but this is an example, and a plurality of the terminals 10 and a plurality of the base stations 20 may be provided.

The terminal 10 is a communication device such as a smart phone, a portable telephone, a tablet, a wearable terminal, and a communication module for machine-to-machine (M2M) which have a radio communication function. The terminal 10 receives a control signal or data from the base station 20 in DL, and transmits the control signal or the data to the base station 20 in UL to use various communication services provided by the radio communication system. For example, a channel transmitted from the terminal 10 includes a physical uplink control channel (PUCCH) and a physical uplink shared channel (PUSCH). In addition, the terminal 10 may be referred to as a UE, and the base station 20 may be referred to as a gNB.

In the embodiments, a duplex method may be a time division duplex (TDD) method or a frequency division duplex (FDD) method.

In addition, in the embodiment, with regard to description of "a radio parameter or the like is configured", a predetermined value may be pre-configured, or may be configured on the basis of a radio parameter indicated by the base station 20 or the terminal 10.

The base station 20 is a communication device that provides one or more cells and that performs radio communication with the terminal 10. Physical resources of a radio signal are defined in a time domain and a frequency domain, the time domain may be defined by a number of OFDM symbols, and the frequency domain may be defined by a number of sub-carriers or a number of resource blocks. The base station 20 transmits synchronization signals and system information to the terminal 10. The synchronization signals are, for example, NR-PSS and NR-SSS. A part of the system information is transmitted, for example, by NR-PBCH, and is also called broadcast information. The synchronization signal and broadcast information may be periodically transmitted as an SS block (SS/PBCH block) formed of a predetermined number of OFDM symbols. For example, the base station 20 transmits a control signal or data in Downlink (DL) to the terminal 10 and receives a control signal or data in Uplink (UL) from the terminal 10. Both the base station 20 and the terminal 10 are capable of beam forming to transmit and receive signals. For example, a reference signal transmitted from the base station 20 includes a Channel State Information Reference Signal (CSI-RS) and a channel transmitted from the base station 20 includes a Physical Downlink Control Channel (PDCCH) and a Physical Downlink Shared Channel (PDCCH).

(Multi-Numerology)

In order to support a wide range of frequencies and use cases in 5G, it is necessary to support multiple numerologies (radio parameters such as a subcarrier spacing and a symbol length).

Accordingly, it is effective to design variable parameters in a scalable manner on the basis of LTE numerology. Based on this idea, Multi-Numerology of NR has been introduced. Specifically, the reference subcarrier spacing is the same as the LTE subcarrier spacing, and is set to 15 kHz. Other subcarrier spacings are defined by multiplying the reference subcarrier spacing by a power of 2. A plurality of subcarrier spacing configurations p are defined. Specifically, for $\mu=0$, the subcarrier spacing $\Delta f=15$ kHz and Cyclic prefix=Normal may be specified; for $\mu=1$, the subcarrier spacing $\Delta f=30$ kHz and Cyclic prefix=Normal may be specified; for $\mu=2$, the subcarrier spacing $\Delta f=60$ kHz and Cyclic prefix=Normal or Extended may be specified; for $\mu=3$, the subcarrier spacing $\Delta f=120$ kHz and Cylic prefix=Normal may be specified; and for $\mu=4$, the subcarrier spacing $\Delta f=240$ kHz and Cyclic prefix=Normal may be specified.

The number of OFDM symbols included in one slot is set to 14 for any of the subcarrier spacing configurations $\mu=0$, 1, 2, 3, and 4. However, for the subcarrier spacing configurations $\mu=0$, 1, 2, 3, and 4, the number of slots included in one frame is set to 10, 20, 40, 80, and 160, and the number of slots included in one sub-frame is set to 1, 2, 4, 8, and 16. Here, since the frame length is 10 ms, for the subcarrier spacing configurations $\mu=0$, 1, 2, 3, and 4, the slot lengths are set to 1 ms, 0.5 ms, 0.25 ms, 0.125 ms, and 0.625 ms. Since the number of OFDM symbols included in one slot is set to 14 for any of the subcarrier spacing configurations $\mu=0$, 1, 2, 3, and 4, the OFDM symbol lengths differ for every subcarrier spacing configurations. For the subcarrier spacing configurations $\mu=0$, 1, 2, 3, and 4, the OFDM symbol lengths are set to (1/14) ms, (0.5/14) ms, (0.25/14) ms, (0.125/14) ms and (0.0625/14) ms. As described above, by shortening the slot length and the OFDM symbol length, low-latency communication can be achieved. For example, the base station 20 can configure the subcarrier spacing for the terminal 10 by specifying any of $\mu=0$, 1, 2, 3, and 4 in a subcarrier spacing that is a parameter of an information element BWP.

(Extension of NR to Frequency Band Higher than or Equal to 52.6 GHz)

Under the new radio (NR) Release 15 and the NR Release 16 of the third generation partnership project (3GPP), a frequency band up to the upper limit of 52.6 GHz is the target. With regard to extension of the NR to a frequency band higher than or equal to 52.6 GHz, in Release 16, a study item exists at a technical specification group radio access network (TSG RAN) level in which various regulations, use cases, requirements, and the like are examined. The study of the study item was completed in December 2019, and in Release 17, a study item and a work item for actually extending a technical specification to 52.6 GHz or higher have been agreed.

Figure 2:
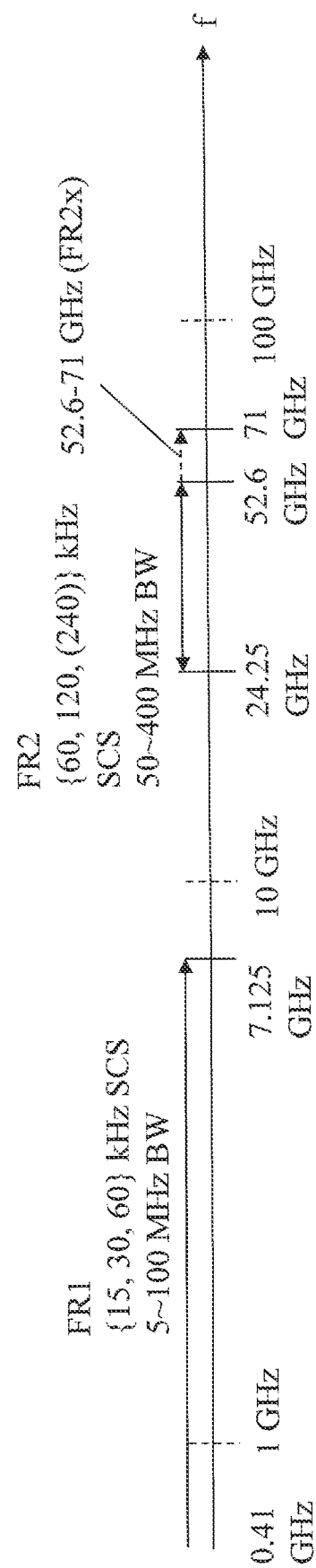
FIG. 2 is a diagram illustrating an example of extension of a frequency band of NR.

In the study items in Release 16, as an NR frequency band, extension from 52.6 GHz to 114.25 GHz was assumed, but in Release 17, time for the study is limited, and, thus, it is assumed that the frequency band to be studied is limited to a range from 52.6 GHz to 71 GHz as illustrated in FIG. 2. In addition, when extending the NR frequency band from 52.6 GHz to 71 GHz, it is assumed that extension is carried out on the basis of design of current NR frequency range 2 (FR2). The reason for this is because it is assumed that a considerable amount of time will be spent to conduct an examination on a new wave form.

In addition, the reason for limiting the frequency band to be studied to the range from 52.6 GHz to 71 GHz is as follows. For example, in a frequency band of 71 GHz or lower, a frequency band of 54 GHz to 71 GHz already exists as an unlicensed frequency band available for use in each country. In addition, at a word radio communication conference 2019 (WRC-2019), as a candidate for new frequency band for international mobile telecommunication (IMT), a frequency band from 66 GHz to 71 GHz is the highest frequency band. Thus, no frequency band higher than or equal to 71 GHz is available for use as a licensed band.

Current NR frequency bands include frequency range 1 (FR1), which corresponds to a frequency band of 410 MHz to 7.125 GHz, and FR2, which corresponds to a frequency band of 24.25 GHz to 52.6 GHz.

Note that, with regard to the frequency band of 52.6 GHz to 71 GHz, the definition of the current FR2 (frequency band of 24.25 GHz to 52.6 GHz) may be modified, and the frequency band may be included in a modified FR2, or may be defined as a new frequency range (FR) separately from the FR2.

(Objectives of Work Item)
(RAN1: Feature of Physical Layer)

One or a plurality of new numerologies for the terminal 10 and the base station 20 to operate in a frequency band of 52.6 GHz to 71 GHz. In a case where an influence on a physical signal/channel specified in a study item (SI), a countermeasure is taken for the influence.

Features related to the timeline suitable for each new numerology. For example, preparing time and calculation time for each of bandwidth part (BWP) and beam switching time, hybrid automatic repeat request (HARQ) scheduling, user equipment (UE) processing, physical downlink shared channel (PDSCH), physical uplink shared channel (PUSCH)/sounding reference signal (SRS), and channel state information (CSI).

Up to 64 synchronization signal block (SSB) beams for an operation in a licensed frequency band and an operation in an unlicensed frequency band in a frequency band of 52.6 GHz to 71 GHz.

(RAN1: Physical Layer Procedure)

A channel access mechanism that expects a beam-based operation so that regulatory requirements applied to the unlicensed frequency band from 52.6 GHz to 71 GHz are to be met.

(RAN4: Core Specifications for Requirements of UE, gNB, and Radio Resource Management (RRM))

Definition of RF core requirements of gNB and UE in a frequency band of 52.6 GHz to 71 GHz. A limited set of a combination of bands is included.

(Outline of SSB)

An SSB is a synchronization signal/broadcast channel block formed of synchronization signals (SS) and a broadcast channel (PBCH). An SS is periodically transmitted from the base station 20 in order for the terminal 10 to perform detection of a cell ID and reception timing at the time of starting communication, and a PBCH is transmitted together with the SS to transmit, to the terminal 10, a notification of information required for a frame timing synchronization and a PDCCH reception. In NR, the SSB is also used to measure the reception quality of each cell.

In the Release 15 NR, the transmission period for transmitting the SSB of a serving cell can be selected. Specifically, the transmission period of the SSB can be selected from among 5 ms, 10 ms, 20 ms, 40 ms, 80 ms, and 160 ms. During initial access, since the terminal 10 has not receive radio resource control (RRC) information or the like, 20 ms is assumed as the transmission period of the SSB. Accordingly, in a cell that is operated in stand-alone for the initial access, it may be assumed that SSBs are transmitted with the transmission period that is less than or equal to 20 ms in many cases.

In addition, for an SSB, a beam index (SS/PBCH block index) that is also used to actually transmit the SSB can be transmitted. The notification of the beam index that is actually used to transmit the SSB can be transmitted by using an information element (IE), such as SSB-PositionsInburst with SIB1 or RRC signaling. In FR1, up to eight SSBs can be transmitted with eight beams corresponding to the SSBs, and, thus, a notification of beam indexes that are actually used for transmitting the SSBs is transmitted by using an 8-bit bit map. In FR2, up to 64 SSBs can be transmitted with 64 beams corresponding to the SSBs, and, thus, in RRC signaling, a notification of beam indexes that are actually used for transmitting the SSBs is transmitted with a 64-bit bit map. However, when the 64-bit bit map is included in SIB1, an overhead increases. Accordingly, in a case where a notification beam indexes of the beams that are actually transmitted is to be transmitted in SIB1, the notification of the beam indexes is transmitted by a total of 16 bits that are an 8-bit bit map and an 8-bit group bit map. Namely, 64 beams corresponding 64 SSBs are divided into a total of eight groups each including eight SSB beams, and a notification of beam indexes of SSBs that are actually transmitted is transmitted by using (i) an 8-bit bit map that indicates which SSB beam in each group is to be transmitted and (ii) another 8-bit bit map for all the groups that indicates a group from among the 8 groups in which the SSB beam is to be transmitted. Furthermore, in FR1 and FR2 excluding an unlicensed frequency, as described below, there is one position per half frame at which an SSB can be transmitted with a beam. Accordingly, a notification of a beam index (SS/PBCH block index) actually used for transmitting an SSB can be interpreted as a notification of a time resource in a half frame in which the SSB is transmitted, so that the beam index can be used for a rate matching during a PDSCH reception.

As an index relating to the SSB, in addition to the above-described beam index (SS/PBCH block index) that is actually used for transmitting the SSB, a candidate SSB position index (Candidate SS/PBCH block index) is defined. The candidate SSB position index is an index that specifies a position at which the SSB can be transmitted with a beam in a half frame. In FR1 excluding an unlicensed frequency, up to eight SSBs can be transmitted by corresponding eight beams, so that it suffices if there is one position in a half frame at which an SSB transmission by using the corresponding beam is possible. Accordingly, by defining the correspondence between the indexes from Number 0 to Number 8 and the SSBs, the candidate SSB position index can be identified. Accordingly, three bits are necessary to identify the candidate SSB position index. Since it is possible to generate eight patterns in the same cell by using sequence patterns for a Demodulation Reference Signal (DMRS) on a Physical Broadcast Channel (PBCH), by using the sequence pattern, the three bits for identifying the candidate SSB position index can be detected.

In FR2, up to 64 SSBs can be transmitted by using the corresponding 64 beams, so that it suffices if there is one position in a half frame at which an SSB transmission by using the corresponding beam is possible. Accordingly, by defining the correspondence between the indexes from Number 0 to Number 63 and the SSBs, the candidate SSB position index can be identified. Accordingly, six bits are necessary to identify the candidate SSB position index. However, if the number of patterns of the PBCH DMRS sequence is increased, DMRS detection performance may deteriorate. Accordingly, eight patterns are specified for the DMRS sequence of the PBCH. The remaining three bits for identifying 64 candidate SSB position indexes are transmitted in a PBCH payload. That is, in FR2, the three least significant bits (LSBs) of the candidate SSB position index are to be detected by the DMRS sequence of the PBCH, and the 3 most significant bits (MSBs) of the candidate SSB position index are to be detected by information transmitted in the PBCH payload.

With respect to measurement based on the SSB in the Release 15 NR, a function (SSB based RRM measurement timing configuration window (SMTC window) configured by an information element SSB-MTC) for transmitting, from the base station 20 to the terminal 10, a notification of a measurement period and measurement timing of the SSB used by the terminal 10 for the measurement has been introduced. The SMTC window is a measurement window that is configured for the terminal 10 by the base station 20 so as to transmit a notification of a measurement start timing, a time interval for the measurement, and a measurement period per cell to be measured when the terminal 10 performs received quality measurement by using the SSB. The period of the SMTC window can be selected from among 5 ms, 10 ms, 20 ms, 40 ms, 80 ms, and 160 ms. In addition, offset granularity of the SMTC window is 1 ms. In addition, duration of the SMTC window can be selected from among 1 ms, 2 ms, 3 ms, 4 ms, and 5 ms. The base station 20 can transmit a notification of a beam index of the SSB to be measured by using information element SSB-ToMeasure. With regard to the FR1, a notification of the beam index of the SSB to be measured can be transmitted by using the 8-bit bit map, and with regard to the FR2, a notification of the beam index of the SSB to be measured can be transmitted by using the 64-bit bit map.

(Function Extension Related to SSB in Release 16 New Radio Unlicensed (NR-U))

A frequency band of release 16 NR-U is in a 5 GHz band and a 6 GHz band, and, thus, the frequency band is included in the FR1. NR-U is an unlicensed band, and, thus, it is assumed that the NR-U coexists with other communication systems such as Wi-Fi, another NR-U system, and the like.

Accordingly, in the unlicensed frequency band, in a case where the terminal 10 and/or the base station 20 of the NR-U initiates transmission, in order to confirm that another nearby terminal (for example, a terminal corresponding to Wi-Fi 802.11ac method) or another nearby base station (for example, an access point corresponding to Wi-Fi 802.11ac method) in transmission is not present, the terminal 10 and/or the base station 20 of the NR-U is assumed to perform listen before talk (LBT). The LBT is a communication method that performs carrier sensing before initiating transmission, and enables transmission within a predetermined time length only in a case where it is confirmed that a channel is not used by another nearby system.

It is undesirable that a reference signal that is to be used for maintaining cell connection and for measuring a signal quality, such as an SSB, cannot be transmitted due to the LBT. However, it is also undesirable that the SSB can be transmitted in a case where another system is transmitting a signal. Accordingly, a candidate position for an SSB transmission is extended. As in a case where another system is transmitting a signal at a transmission candidate position where the SSB is scheduled to be transmitted, in a case where the SSB cannot be transmitted at the transmission candidate position where the SSB is scheduled to be transmitted, the SSB may be transmitted at a subsequent transmission candidate position. In an unlicensed band of FR1, a subcarrier spacing (SCS) of 15 kHz and an SCS of 30 kHz can be used for an SSB. In the unlicensed band of FR1, in the case of using the SCS of 15 kHz, the candidate position for an SSB transmission is extended to 10 positions. In addition, in the unlicensed band of FR1, in the case of using the SCS of 30 kHz, the candidate position for an SSB transmission is extended to 20 positions. That is, one or more positions at which an SSB transmission by using the corresponding beam is possible exist in a half frame.

Figure 4:
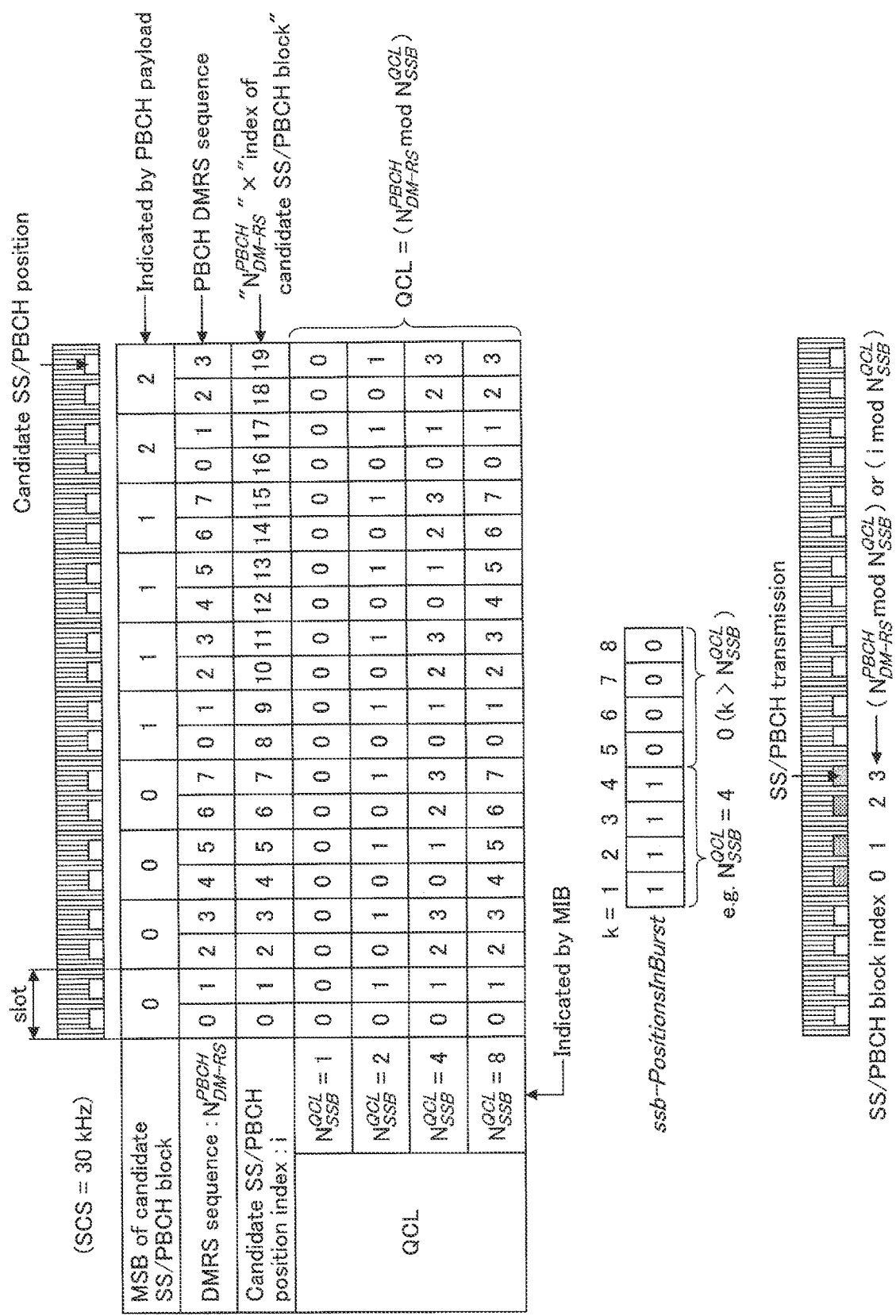
FIG. 4 is a diagram illustrating an example of twenty candidate positions for an SSB transmission.

For example, as illustrated in FIG. 4, in a case where the SCS is 30 kHz, two candidate positions for an SSB transmission may be configured for each slot in a half frame of 5 ms. The upper limit of the number of the SSBs that can be actually transmitted is set to eight. Among the twenty candidate positions for an SSB transmission illustrated in FIG. 4, the necessary number of SSBs may be transmitted sequentially from a candidate position for an SSB transmission at which the LBT has been successful.

As described above, as an SSB index, an index (for example, a candidate SS/PBCH block index) indicating a position (may be a time domain position, a frequency domain position, or a time and frequency domain position) at which the SSB is to be transmitted, and an index (SS/PBCH block index) indicating a beam with which the corresponding SSB is transmitted may be defined.

For example, as illustrated in FIG. 4, in a case where the SCS is 30 kHz, suppose that twenty candidate positions for an SSB transmission (time domain positions) are configured. In the example in FIG. 4, the twenty transmission candidate positions are indicated by the candidate SS/PBCH block index. The candidate SS/PBCH block index is information necessary for determining the timing within 5 ms at which the terminal detects the SSB, i.e., information necessary for the terminal 10 to determine a frame timing.

In addition, in the example in FIG. 4, information necessary to derive an index (SS/PBCH block index) indicating the beam from among up to 8 beams with which the SSB is transmitted, i.e., quasi co-location (QCL) information is attached to each transmission candidate position. For example, when the terminal 10 reports quality per beam to the base station 20, the QCL information may be used.

In the example in FIG. 4, in a case where the SCS is 30 kHz, ten slots are included within 5 ms, and two candidate positions for an SSB transmission are included per slot. Candidate SS/PBCH block indexes from 0 to 19 are sequentially attached to the twenty candidate positions for an SSB transmission from the start.

In this case, since eight patterns can be used as the PBCH DMRS sequence, indexes from 0 to 7 can be attached to the candidate position for an SSB transmission by using the patterns of the PBCH DMRS sequence. In the example in FIG. 4, DMRS sequences from 0 to 7 correspond to the candidate positions for an SSB transmission with the candidate SS/PBCH block indexes from 0 to 7, and the DMRS sequences 0 to 7 corresponds to the candidate positions for an SSB transmission with the candidate SS/PBCH block indexes from 8 to 15, and the DMRS sequences 0 to 3 correspond to the candidate positions for an SSB transmission with the candidate SS/PBCH block indexes from 16 to 19. Namely, the correspondence is defined such that a DMRS sequence of a PBCH to be used is uniquely determined by specifying a candidate position for an SSB transmission.

In addition, as illustrated in the example in FIG. 4, when information on the bits corresponding to MSBs of the candidate SS/PBCH block index transmitted by the PBCH payload is obtained, it is possible to uniquely determine the candidate SS/PBCH block index by the MSBs and the DMRS sequence. Note that, in the example in FIG. 4, the base station 20 may directly transmit, to the terminal 10, a notification of the candidate SS/PBCH block index. For example, the base station 20 may transmit information on the bits corresponding to the MSBs of the candidate SS/PBCH block index, and the PBCH DMRS to the terminal 10, and the terminal 10 may derive the candidate SS/PBCH block index based on the bit information corresponding to the MSBs of the candidate SS/PBCH block index and the PBCH DMRS sequence.

In addition, in the example in FIG. 4, in a case where the number of beams transmitted by the base station 20 is eight, the beams are repeated per eight candidate positions for an SSB transmission. In the example in FIG. 4, SS/PBCH block indexes from 0 to 7 correspond to the candidate positions for an SSB transmission with the candidate SS/PBCH block indexes from 0 to 7, SS/PBCH block indexes from 0 to 7 correspond to the candidate positions for an SSB transmission with the candidate SS/PBCH block indexes from 8 to 15, and SS/PBCH block indexes from 0 to 3 correspond to the candidate positions for an SSB transmission with the candidate SS/PBCH block indexes from 16 to 19.

For example, the window of 5 ms illustrated in FIG. 4 is configured per transmission period of 20 ms for an SSB, in which there are twenty candidate positions for the SSB transmission, and the candidate transmission position at which the SSB is to be transmitted depends on the transmission period of 20 ms for the SSB. For example, QCL information is necessary so as to determine that a beam used for a transmission of an SSB detected at a position where the candidate SS/PBCH block index is 0 in the SSB transmission period of 20 ms is the same as a beam used for another transmission of another SSB detected at a position where the candidate SS/PBCH block index is 4 in the subsequent SSB transmission period of 20 ms. In a case where eight QCLs exist, since eight beams are repeated, a beam used in transmission of an SSB detected at a position where the candidate SS/PBCH block index is 0, and a beam used in transmission of an SSB detected at a position where the candidate SS/PBCH block index is 4 in the subsequent SSB transmission period of 20 ms are different from each other (that is, the SS/PBCH block indexes are different from each other). In addition, beams used in transmissions of SSBs at positions where the candidate SS/PBCH block indexes are 0, 8, and 16 are the same (that is, the same SS/PBCH block indexes).

In addition, in the example in FIG. 4, in a case where the base station 20 transmits, to the terminal 10, a notification of four as a QCL parameter, four beams are to be used. In this case, the correspondence is such that the beams with beam indexes 0, 1, 2, and 3 are used for transmissions of SSBs at positions with the candidate SS/PBCH block indexes from 0 to 3. In this case, the beams used in the transmissions of the SSBs at positions with the candidate SS/PBCH block indexes 0 and 4 are the same (that is, the same SS/PBCH block indexes). For example, a beam used to transmit an SSB detected at a position with the candidate SS/PBCH block index 0 in an SSB transmission period is determined to be the same as a beam used to transmit an SSB detected at a position with the candidate SS/PBCH block index 4 in another SSB transmission period, and beam quality can be measured, for example, by averaging these.

Note that, a notification of a QCL parameter may be transmitted in the PBCH payload.

In addition, in the case of the NR-U, the number of the candidate positions for an SSB transmission is twenty, and an actual SSB transmission position may be different per SSB transmission period due to a result of the LBT, and, thus, it may not be possible to use ssb-PositionsInBurst to indicate the transmission candidate position at which the SSB beam is to be transmitted. However, by the ssb-PositionsInBurst, it is possible to indicate the number of SSBs to be transmitted and the patterns with which the SSBs are to be transmitted.

In the following, an example is illustrated in which four symbols of an SSB in the time direction are mapped onto symbols in a slot and a slot including a candidate position for an SSB transmission is mapped to a slot in a time unit, such as 5 ms. In Release 15, the five cases, which are Cases A, B, C, D, and E, are defined, as the mapping.

Figure 3:
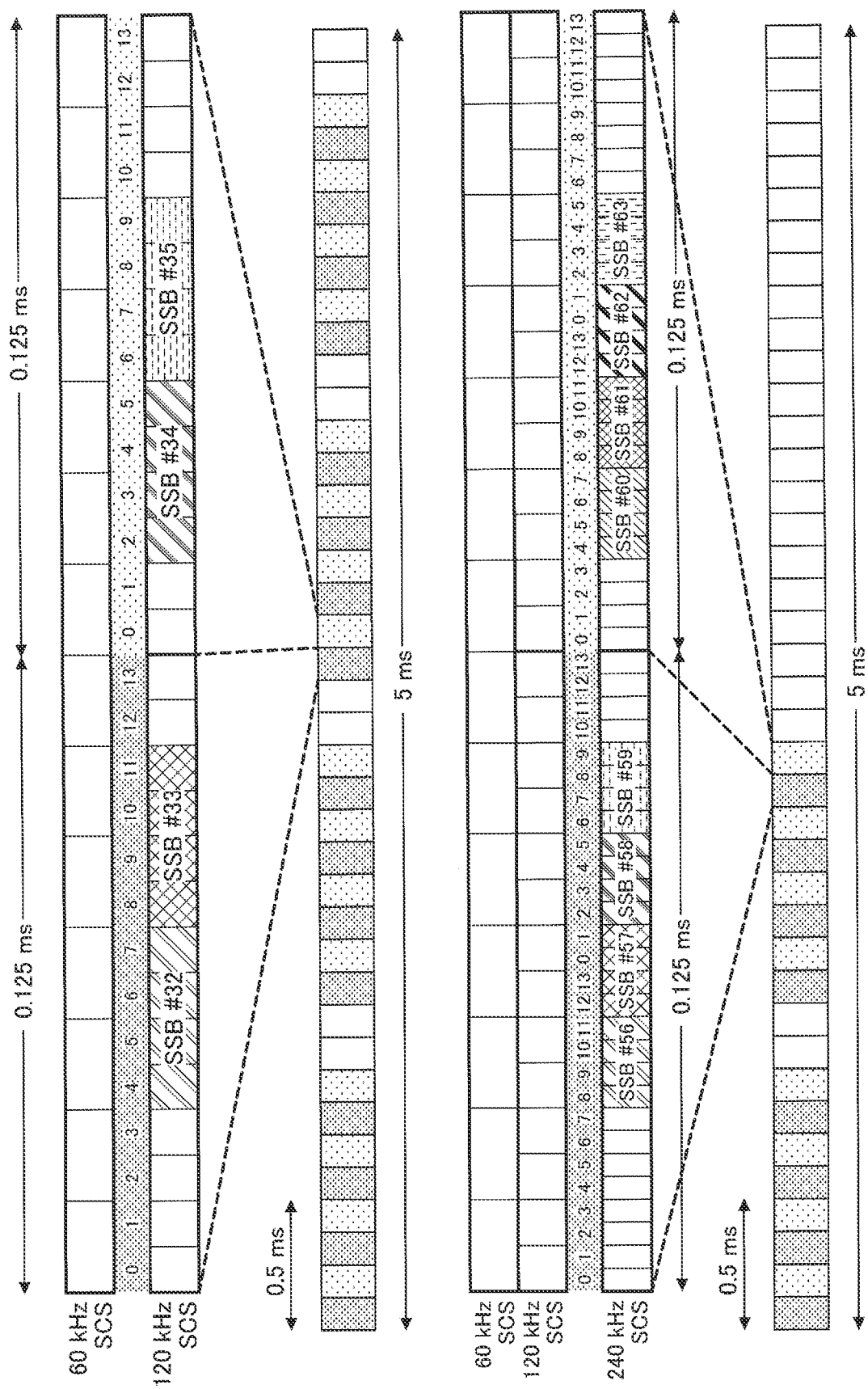
FIG. 3 is a diagram illustrating an example of SSB burst structure cases D and E in the FR2 of Release 15 NR.

FIG. 3 is a diagram illustrating an example of the SSB burst structure cases D and E in the FR2 of Release 15 NR. In the example of FIG. 4 indicated in the upper side, the SCS is 120 kHz. In the example of FIG. 4 indicated in the upper side, two SSBs are mapped to be adjacent to each other in a slot of 120 kHz. A pattern in which no SSB is mapped onto the four start symbols and onto the two end symbols and a pattern in which no SSB is mapped onto the two start symbols and the four end symbols are alternately repeated between two continuous slots. The patterns are repeated in a length corresponding to eight slots, and two slots that do not include an SSB are placed. Sixty four candidate positions for an SSB transmission are configured by repeating the patterns.

In the example in FIG. 3 indicated in the lower side, the SCS is 240 kHz. In this case, the SCS of the SSB is 240 kHz. However, the SCS of 240 kHz cannot be used for data and control channels, and an SCS of 60 kHz or an SCS of 120 kHz is used for the data and control channels. In the example in FIG. 3 indicated in the lower side, four SSBs are mapped to be adjacent to each other in a slot of 120 kHz (for the data). A pattern in which no SSB is mapped onto the eight start symbols and onto the four end symbols and a pattern in which no SSB is mapped onto the four start symbols and eight end symbols are alternately repeated between two continuous slots of 120 kHz. After the patterns are repeated in a length corresponding to eight slots of 120 kHz, two slots of 120 kHz that do not include an SSB are placed. Sixty four candidate positions for an SSB transmission are configured by repeating the patterns.

(Problem)

It is expected to support up to 64 SSB beams in the frequency band from the 52.6 GHz to 71 GHz. In the unlicensed frequency band included in the frequency band from 52.6 GHz to 71 GHz, the number of candidate positions for an SSB transmission is assumed to be 64. The reason is that, since 64 candidate positions for an SSB transmission have already been defined in Release 15, it may possible to reduce a load caused by a change in the technical specification, which is caused by changing the number of the candidate positions for an SSB transmission.

In the unlicensed frequency band included in the frequency band from 52.6 GHz to 71 GHz, LBT failure may occur, and, thus, it may be impossible to transmit a beam to be transmitted. However, if the number of the candidate positions for transmitting an SSB is increased, the number of bits required to represent an index of the candidate positions for an SSB transmission would also be increased. If the number of bits required to represent the index of the candidate positions for an SSB transmission increases, it may be necessary to change the technical specification in order to transmit the index of the candidate positions for an SSB transmission from the base station 20 to the terminal 10. Furthermore, there are limited bits available to transmit the index of the candidate positions for an SSB transmission from the base station 20 to the terminal 10.

A PBCH payload is divided into the MIB and the other portion to be used by the physical layer. In the PBCH payload, only 8 bits are used by the physical layer, and it has already been specified in FR2 as to how to use the 8 bits.

As for the MIB, the transmission periodicity of the PBCH is defined to be 80 ms in NR. It has been specified that the content of MIB information in the 80 ms shall be the same. As for the bits representing the index of the candidate positions for an SSB transmission, when the index of the candidate positions for an SSB transmission is changed, the bit value may also be changed.

Accordingly, if the index of the candidate positions for an SSB transmission are to be represented by some bits of the MIB, it may be unable to meet the requirement that the content of the MIB in the 80 ms shall be the same. Thus, it is difficult to represent a portion of an index of candidate positions for an SSB transmission by the bits of the MIB.

When the number of the candidate positions for an SSB transmission is 64 and 64 beams are to be transmitted, there is only one candidate position for a transmission in one period per beam. In this case, for example, if the LBT fails, it is impossible to transmit a beam that should be transmitted. In this case, for example, the terminal 10 may determine that the quality of the detected SSB beam has rapidly dropped, and the terminal 10 may switch to another carrier.

Accordingly, taking the LBT into consideration, in the case of the unlicensed frequency band included in the frequency band from 52.6 GHz to 71 GHz, it is also preferable that a plurality of transmission candidate positions be configured as the candidate positions for transmitting an SSB with a certain beam.
(Proposal)

In the case of the unlicensed frequency band included in the frequency band from 52.6 GHz to 71 GHz, the number of SSB candidate positions may be greater than 64. In this case, a method of transmitting a notification of the index of the candidate positions for transmitting an SSB from the base station 20 to the terminal 10 may be specified.
(Proposal 1)

In the unlicensed frequency band included in the frequency band from 52.6 GHz to 71 GHz, for each beam for transmitting an SSB, candidate positions for transmitting an SSB may be specified so that multiple candidate positions for transmitting the SSB are to be configured within a discovery burst transmission window. That is, if the number of beams for transmitting SSBs is 64, more than 64 candidate positions for an SSB transmission may be configured within the discovery burst transmission window.

For an operation of the unlicensed frequency band included in the frequency band from 52.6 GHz to 71 GHz, the maximum length of a discovery burst transmission window may be a fixed value (e.g., 5 ms). The maximum length (or simply the length) of the discovery burst transmission window may differ for SCSs. For example, the length may be shorter for a larger SSB SCS (e.g., 5 ms for 60 kHz SSB SCS and 2 ms for 240 kHz SSB SCS). Each slot in the window may include a candidate position for an SSB transmission. In the case of operating the unlicensed frequency band, the terminal 10 may assume (determine) that the transmission of the SSB in the half frame is within a discovery burst transmission window. A discovery burst transmission window may start at a predetermined position (e.g., a first symbol of a first slot in the half frame). This predetermined position may be a position defined in advance or a position that is configured based on information related the discovery burst transmission window (e.g., information indicating a slot and/or a symbol) received from the base station 20. The base station 20 can set a time length of a discovery burst transmission window to the terminal 10 by an information element DiscoveryBurst-WindowLength, per serving cell or per BWP. If the information element DiscoveryBurst-WindowLength is not provided, the terminal 10 may assume (determine) that the time length of the discovery burst transmission window is a predetermined length (e.g., a half frame). A discovery burst is a downlink transmission burst that includes a set of signals and/or channels limited to a window and associated with a duty cycle. The discovery burst may also be a transmission from a base station 20 including an SSB, for example, formed of a primary synchronization signal (PSS), a secondary synchronization signal (SSS), a physical broadcast channel (PBCH), and a demodulation reference signal (DM-RS) associated with the PBCH.
(Proposal 2)

The terminal 10 may be able to derive an index of a candidate position for an SSB transmission based on the detected SSB. In this case, the assumption on the detection of the SSB by the terminal 10 in the unlicensed frequency band included in the frequency band from 52.6 GHz to 71 GHz may be changed from the assumption of the terminal 10 in Releases 15 and 16 NR, so that additional information necessary to identify the index of the candidate position for transmitting the SSB can be transmitted by the SSB. Note that the terminal 10 may receive the maximum number (or the number) of candidate positions for transmitting an SSB from the base station 20 by RRC signaling.
(Proposal 3)

In the case of the unlicensed frequency band included in the frequency band from 52.6 GHz to 71 GHz, the number of the candidate positions for transmitting an SSB may be greater than 64. In the case of the unlicensed frequency band included in the 24.25 GHz to 52.6 GHz band, the number of the candidate positions for transmitting an SSB may also be greater than 64. Furthermore, in the case of a licensed frequency band included in the 24.25 GHz (or 52.6 GHz) to 71 GHz band, the number of the candidate positions for transmitting an SSB may be greater than 64.
(Details of Proposal 1 (Candidate Positions for Transmitting an SSB))

In the unlicensed frequency band included in the frequency band from 52.6 GHz to 71 GHz, the candidate positions for transmitting an SSB may be specified so that multiple candidate positions for transmitting an SSB are configured within a discovery burst transmission window for each beam for transmitting the SSB.
(Option 1)

The maximum number of the candidate positions for transmitting an SSB within the discovery burst transmission window may be a fixed number (e.g., 128) regardless of the SSB SCS (e.g., regardless the SCS from among multiple SCSs).
(Option 2)

The maximum number of the candidate positions for transmitting an SSB within the discovery burst transmission window may differ for each SSB SCS. For example, the maximum number (or the number) of the candidate positions for transmitting an SSB with a large SCS may be greater than the maximum number (or number) of the candidate positions for transmitting an SSB with a small SCS.
(Details of Proposal 1 (Time Length of the Discovery Burst Transmission Window))

A time length (e.g., the maximum time length) of the discovery burst transmission window may be specified in the unlicensed frequency band included in the frequency band from 52.6 GHz to 71 GHz. The terminal 10 may also receive, from the base station 20, the time length of the discovery burst transmission window (e.g., the maximum time length) and/or the maximum number (the number) of the candidate positions for transmitting an SSB, by RRC signaling.

(Option 1)

In the unlicensed frequency band included in the frequency band from 52.6 GHz to 71 GHz, the maximum time length of the discovery burst transmission window may be 5 ms as in the case of Release 16 NR.

(Option 2)

The maximum length of the discovery burst transmission window in the unlicensed frequency band included in the frequency band from 52.6 GHz to 71 GHz may be a certain fixed value (may be longer or shorter than 5 ms).

(Option 3)

In the unlicensed frequency band included in the frequency band from 52.6 GHz to 71 GHz, the maximum length of the discovery burst transmission window may be different values for various values of SCS of the SSB. For example, if SCS of the SSB is larger, the maximum length of the discovery burst transmission window may be shorter.

(Details of Proposal 2)

In the unlicensed frequency band included in the frequency band from 52.6 GHz to 71 GHz, the terminal 10 may be able to derive an index of a candidate position for an SSB transmission based on the detected SSB. In this case, the assumption in the detection of the SSB by the terminal 10 in the unlicensed frequency band included in the frequency band from 52.6 GHz to 71 GHz may be changed from the assumption of the terminal 10 in Releases 15 and 16 NR, so that additional information necessary to identify the index of the candidate position for transmitting the SSB can be transmitted by the SSB. If the number of candidate positions for transmitting an SSB is 64, the index of the candidate position for transmitting the SSB can be expressed by 6 bits. If the number of candidate positions for transmitting an SSB is greater than 64, more than 6 bits are required to represent the index of the candidate position for transmitting the SSB. In the following options, methods for transmitting one or more additional bits are proposed.

(Option 1)

The PBCH payload other than the MIB includes a half-frame index. A half frame index is an index (1 bit) indicating whether a 5 ms half frame including the detected SSB is the first half frame of a 10 ms radio frame or the second (latter) half frame of the radio frame. This 1 bit may be used as an additional bit to represent an index of a candidate position for an SSB transmission. In this case, the terminal 10 may assume (determine) that the half-frame index is a fixed value in the unlicensed frequency band included in the frequency band from 52.6 GHz to 71 GHz. For example, it may be specified in a technical specification that, in the unlicensed frequency band included in the frequency band from 52.6 GHz to 71 GHz, the half-frames in which an SSB may be transmitted are assumed to be only the first half frames. Alternatively, it may be specified in a technical specification that, in the unlicensed frequency band included in the frequency band from 52.6 GHz to 71 GHz, the half-frames in which an SSB may be transmitted are assumed to be only the second half frames. Thus, if half-frames in which an SSB may be transmitted are limited to the first half frames or the second half frames, it is unnecessary to transmit a notification of whether the 5 ms half frame including the detected SSB is the first half frame of the 10 ms radio frame or the second half frame of the radio frame. Accordingly, a field for transmitting a half-frame index of the PBCH payload may be used to transmit additional bits to represent an index of a candidate position for an SSB transmission. In this case, 5 ms may be excluded from the transmission periodicity of the SSB. That is, it may be specified that the terminal 10 does not expect (determine) that the transmission periodicity of the SSB is set to 5 ms in the unlicensed frequency band included in the frequency band from 52.6 GHz to 71 GHz.

Figure 5:
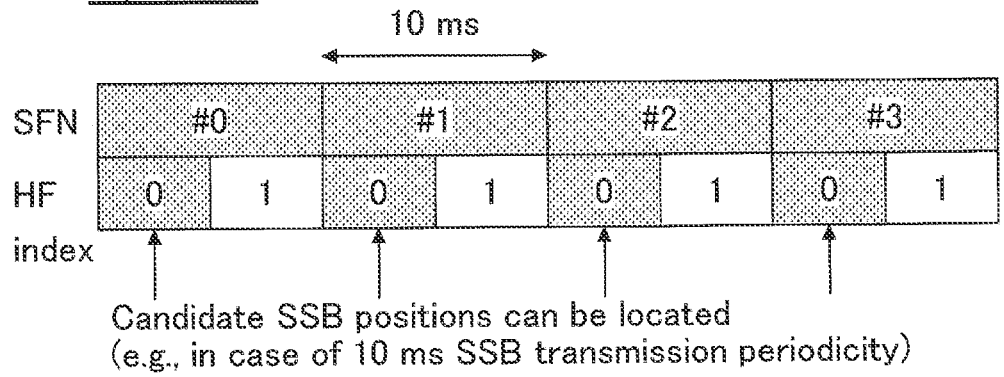
FIG. 5 is a diagram illustrating an example of Option 1.

FIG. 5 is a diagram illustrating an example of Option 1. For example, in an unlicensed frequency band included in the frequency band from 52.6 GHz to 71 GHz, half frames in which an SSB may be transmitted may be limited only to the first half frames. As described above, half frames in which an SSB may be transmitted may be determined based on whether the frequency band is the unlicensed frequency band. Note that, in an unlicensed frequency band, half frames in which an SSB may be transmitted may be limited only to the second half frames.

(Option 2)

For example, in the unlicensed frequency band included in the frequency band from 52.6 GHz to 71 GHz, the terminal 10 may assume that a bit (which may be the LSB, for example) of the system frame number (SFN) of the radio frame including the detected SSB is always a fixed value. For example, in the unlicensed frequency band included in the frequency band from 52.6 GHz to 71 GHz, the terminal 10 may assume that the SSB is transmitted only in a radio frame with an even (or odd) system frame number. In addition, the terminal 10 may assume that the bit (which may be the LSB, for example) of the system frame number is used as an additional bit representing an index of a candidate position for an SSB transmission (which may be the MSB of the index of a candidate position for an SSB transmission). In the case of Option 2, since the radio frames that can transmit an SSB are, for example, only even-numbered or odd-numbered SFN radio frames, 5 ms and 10 ms may be excluded from the transmission periodicity for SSBs. Namely, it may be specified that the terminal 10 does not expect that the transmission periodicity for SSBs are set to 5 ms or 10 ms in the unlicensed frequency band included in the frequency band from 52.6 GHz to 71 GHz.

Figure 6:
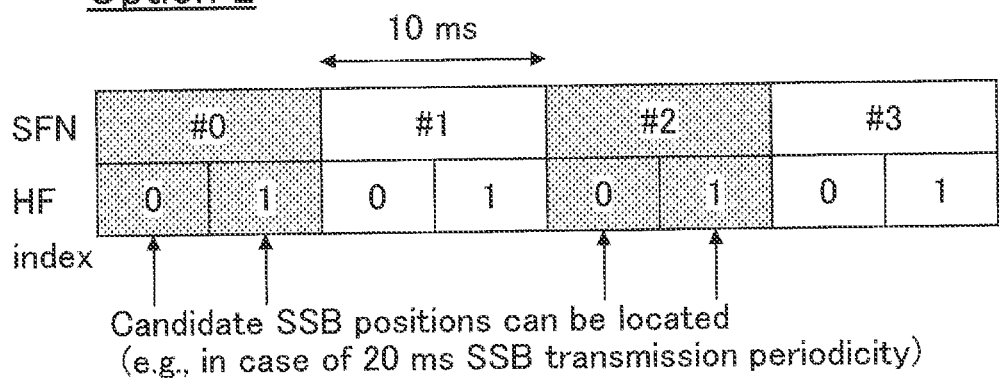
FIG. 6 is a diagram illustrating an example of Option 2.

FIG. 6 is a diagram illustrating an example of Option 2. For example, in the unlicensed frequency band included in the frequency band from 52.6 GHz to 71 GHz, system frame numbers of radio frames in which an SSB may be transmitted may be limited to even numbers. As described above, a system frame number of a radio frame in which an SSB may be transmitted may be determined based on whether the frequency band is the unlicensed frequency band. In the unlicensed frequency band included in the frequency band from 52.6 GHz to 71 GHz, system frame numbers of radio frames in which an SSB may be transmitted may be limited to odd numbers.

(Option 3)

For example, if the number of bits required to represent an index of a candidate position for an SSB transmission is greater than 6 and the number of additional bits required is greater than 1 (e.g., if additional two bits are required), the above-described Option 1 and Option 2 may be combined.

Figure 7:
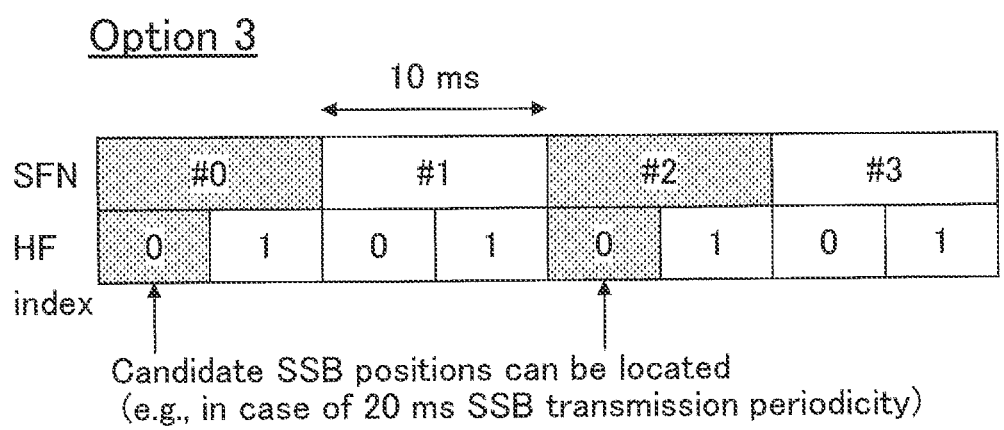
FIG. 7 is a diagram illustrating an example of Option 3.

FIG. 7 is a diagram illustrating an example of Option 3. For example, in the unlicensed frequency band included in the frequency band from 52.6 GHz to 71 GHz, the half frames in which an SSB may be transmitted may be limited only to the first half frames, and system frame numbers of radio frames in which the SSB can be transmitted may be limited to even numbers.

(Option 4)

For example, in the unlicensed frequency band included in the frequency band from 52.6 GHz to 71 GHz, the terminal 10 may assume that the number of candidates for a PBCH DMRS sequence is greater than 8 (e.g., 16) for one cell ID. In this case, the base station 20 may generate a DMRS sequence of a PBCH to be transmitted based on bits of an index of a candidate position for an SSB transmission, which are more than 3 LSBs (e.g., 4 LSBs). The terminal 10 may perform blind detection by assuming more than eight candidates for a PBCH DMRS sequence. The remaining bits representing the index of the candidate position for transmitting the SSB may be transmitted by the PBCH payload.

FIG. 8 is a diagram illustrating an example of Option 4. For example, while assuming that the number of candidates for a PBCH DMRS sequence is 16, an index of a candidate position for an SSB transmission may be identified by the detected PBCH DMRS sequence and/or the PBCH payload. (Option 5)

For example, in the unlicensed frequency band included in the frequency band from 52.6 GHz to 71 GHz, the terminal 10 may assume (determine) that a frequency resource used for a PBCH DMRS in a resource block (RB) is identified by a cell ID and one or more additional bits required to represent an index of a candidate position for an SSB transmission (e.g., the fourth LSB). In Release 15 NR, a frequency resource used for a PBCH DMRS in an RB (12 subcarriers) is determined based only on a cell ID (the offset v of the subcarrier used for the PBCH DMRS is v=(cell ID) mod 4). In the case of Option 5, the offset v of the subcarrier used for the PBCH DMRS may be, for example, v=((cell ID) mod 2)×2+a value (0 or 1) of the fourth LSB of an index of a candidate position for an SSB transmission. In this case, for example, the terminal 10 may detect a value of the fourth LSB of the index of the candidate position for the SSB transmission by performing blind detection of the PBCH DMRS in the set of two frequency resources.

FIG. 9 is a diagram illustrating an example of Option 5. For example, while assuming that the offset v of the sub-carriers used for a PBCH DMRS is obtained by v=((Cell ID) mod 2)×2+a value (0 or 1) of the fourth LSB of an index of a candidate position for an SSB transmission, a value of the fourth LSB of the index of the candidate position for the SSB transmission may be detected by a position of the frequency resource at which the PBCH DMRS is detected. (Option 6)

For example, in the unlicensed frequency band included in the frequency band from 52.6 GHz to 71 GHz, the terminal 10 may assume (determine) that an additional bit required to represent an index of a candidate position for an SSB transmission (e.g., the fourth LSB of an index of a candidate position for an SSB transmission) is represented by a phase offset of a resource for transmitting a PBCH with respect to an SSS. In this case, the phase offset may be, for example, [the value (0 or 1) of the fourth LSB of the index of the candidate position for the SSB transmission]×π. For example, the terminal 10 may detect the value of the fourth LSB of an index of a candidate position for an SSB transmission by blind detection of the phase offset of the resource for transmitting the PBCH with respect to the SSS.

FIG. 10 is a diagram illustrating an example of Option 6. For example, the base station 20 may set the phase offset of the resource for transmitting the PBCH with respect to the SSS to be [the value (0 or 1) of the fourth LSB of an index of a candidate position for an SSB transmission]×π. The terminal 10 may detect the value of the fourth LSB of the index of the candidate position for the SSB transmission by detecting the phase offset of the resource for transmitting the PBCH with respect to the SSS.

In the case of the unlicensed frequency band included in the frequency band from 52.6 GHz to 71 GHz, the number of candidate positions for transmitting an SSB may be greater than 64. However, the embodiments are not limited to the unlicensed frequency band included in the frequency band from 52.6 GHz to 71 GHz. For example, in the case of an unlicensed frequency band included in the frequency band from 24.25 GHz to 52.6 GHz, the number of candidate positions for transmitting an SSB may be greater than 64. Furthermore, for example, in the case of a licensed frequency band included in the frequency band from 24.25 GHz (or 52.6 GH) to 71 GHz, the number of candidate positions for transmitting an SSB may be greater than 64.

The above-described Proposals 1-3 may be combined. That is, the number of candidate positions for transmitting an SSB may be greater than 64 in the case of the unlicensed frequency band included in the frequency band from 52.6 GHz to 71 GHz, and a method of transmitting an index of a candidate position for an SSB transmission from the base station 20 to the terminal 10 may be specified, and/or the terminal 10 may be able to derive an index of a candidate position for an SSB transmission based on the detected SSB, and the assumption of the detection of the SSB by the terminal 10 in the unlicensed frequency band included in the frequency band from 52.6 GHz to 71 GHz may be changed from the assumption of the terminal 10 in Releases 15 and 16 NR, so that additional information required to identify the index of the candidate position for the SSB transmission can be transmitted by the SSB, and/or the number of candidate positions for transmitting an SSB may be greater than 64 in the case of the unlicensed frequency band included in the 24.25 GHz to 52.6 GHz band, and/or the number of candidate positions for transmitting an SSB may be greater than 64 in the case of the licensed frequency band included in the frequency band from 24.25 GHz (or 52.6 GHz) to 71 GHz.

(Device Configuration)

Next, a functional configuration example of the terminal 10 and the base station 20 which execute the above-described processing operations is described. The terminal 10 and the base station 20 are provided with all functions described in the embodiments. However, the terminal 10 and the base station 20 may be provided with partial functions among the all functions described in the embodiments. Note that, the terminal 10 and the base station 20 may be collectively referred to as a communication device.

<Terminal>

Figure 11:
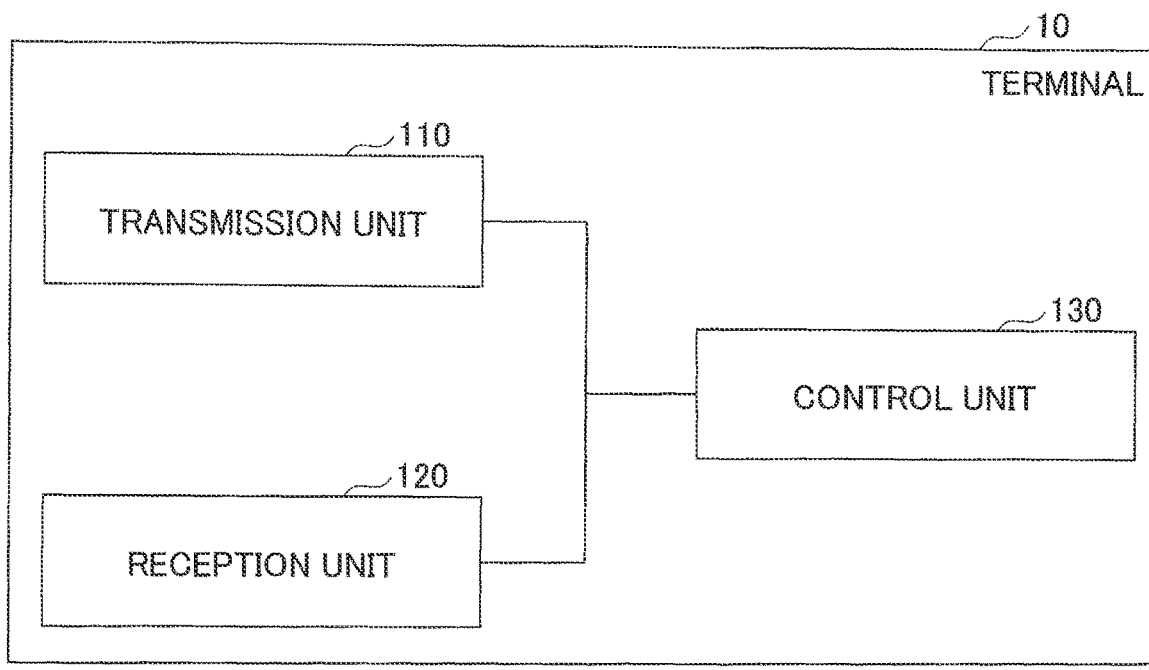
FIG. 11 is a diagram illustrating an example of a functional configuration of a terminal.

FIG. 11 is a diagram illustrating an example of a functional configuration of the terminal 10. As illustrated in FIG. 11, the terminal 10 includes a transmission unit 110, a reception unit 120, and a control unit 130. The functional configuration illustrated in FIG. 11 is illustrative only. A functional division and the names of the functional units may be any division and name as long as the operation according to the embodiments can be executed. Note that, the transmission unit 110 may be referred to as a transmitter, and the reception unit 120 may be referred to as a receiver.

The transmission unit 110 creates transmission from transmission data, and wirelessly transmits the transmission signal. The transmission unit 110 may form one or a plurality of beams. The reception unit 120 wirelessly receives various signals, and acquires a signal of a higher layer from a received physical layer signal. In addition, the reception unit 120 includes a measurement unit that performs measurement of a signal that is received to obtain received power or the like.

The control unit 130 performs control of the terminal 10. Note that, a function of the control unit 130 which relates to transmission may be included in the transmission unit 110, and a function of the control unit 130 which relates to reception may be included in the reception unit 120.

For example, the reception unit 120 may receive a synchronization signal block (SSB) transmitted from the base station 20 in the unlicensed frequency band included in the frequency band from 52.6 GHz to 71 GHz. The control unit 130 may derive a candidate position for an SSB transmission based on the received SSB. The control unit 130 may assume (determine) that the number of candidate positions for transmitting an SSB is greater than 64.

For example, the control unit 130 may derive an index of a candidate position for an SSB transmission based on the SSB received by the reception unit 120 by a method of any of Option 1 to Option 6 of the Proposal 2 in the unlicensed frequency band included in the frequency band from 52.6 GHz to 71 GHz.

<Base Station 20>

Figure 12:
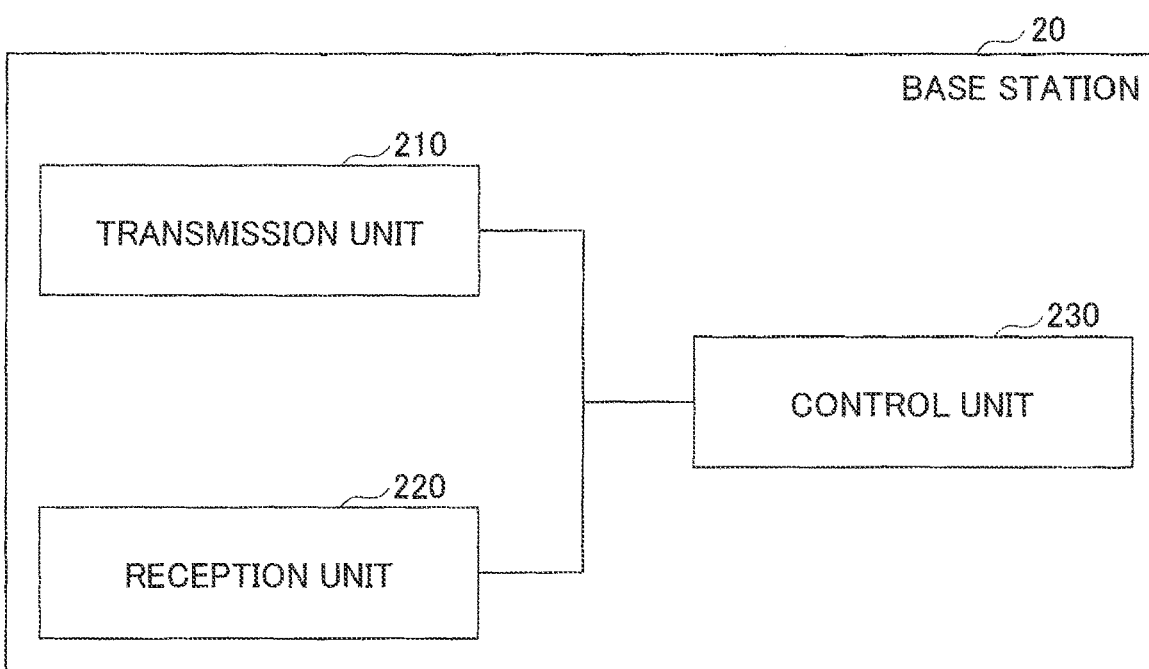
FIG. 12 is a diagram illustrating an example of a functional configuration of a base station.

FIG. 12 is a diagram illustrating an example of a functional configuration of the base station 20. As illustrated in FIG. 11, the base station 20 includes a transmission unit 210, a reception unit 220, and a control unit 230. A functional configuration illustrated in FIG. 11 is illustrative only. A functional division and the names of the functional units may be any division and name as long as the operation according to the embodiments can be executed. Note that, the transmission unit 210 may be referred to as a transmitter, and the reception unit 220 may be referred to as a receiver.

The transmission unit 210 includes a function of generating a signal to be transmitted to the terminal 10 side, and wirelessly transmitting the signal. The reception unit 220 includes a function of receiving various signals transmitted from the terminal 10, and acquiring, for example, information of a higher layer from the received signals. In addition, the reception unit 220 includes a measurement unit that performs measurement of a signal that is received to obtain received power or the like.

The control unit 230 performs control of the base station 20. Note that, a function of the control unit 230 which relates to transmission may be included in the transmission unit 210, and a function of the control unit 230 which relates to reception may be included in the reception unit 220.

The control unit 230 may add, to an SSB, additional information required to derive a candidate position for an SSB transmission in an unlicensed frequency band included in the 52.6 GHz to 71 GHz frequency band by a method of any of Option 1 to Option 6 of Proposal 2. The transmission unit 210 may transmit, to the terminal 10, the SSB to which the additional information required to derive the candidate position for the SSB transmission is added by the control unit 230.

For example, the control unit 230 may set a number greater than 64 as the number of candidate positions for transmitting an SSB in the unlicensed frequency band included in the frequency band from 52.6 GHz to 71 GHz.

<Hardware Configuration>

The block diagrams (FIG. 11 and FIG. 12) which are used in description of the embodiments illustrate blocks in a functional unit. The functional blocks (components) are implemented by a combination of hardware and/or software. In addition, means for implementing respective functional blocks is not particularly limited. That is, the respective functional blocks may be implemented by one device in which a plurality of elements are physically and/or logically combined. In addition, two or more devices, which are physically and/or logically separated from each other, may be directly and/or indirectly connected (for example, in a wired manner and/or a wireless manner), and the respective functional blocks may be implemented by a plurality of the devices.

Figure 13:
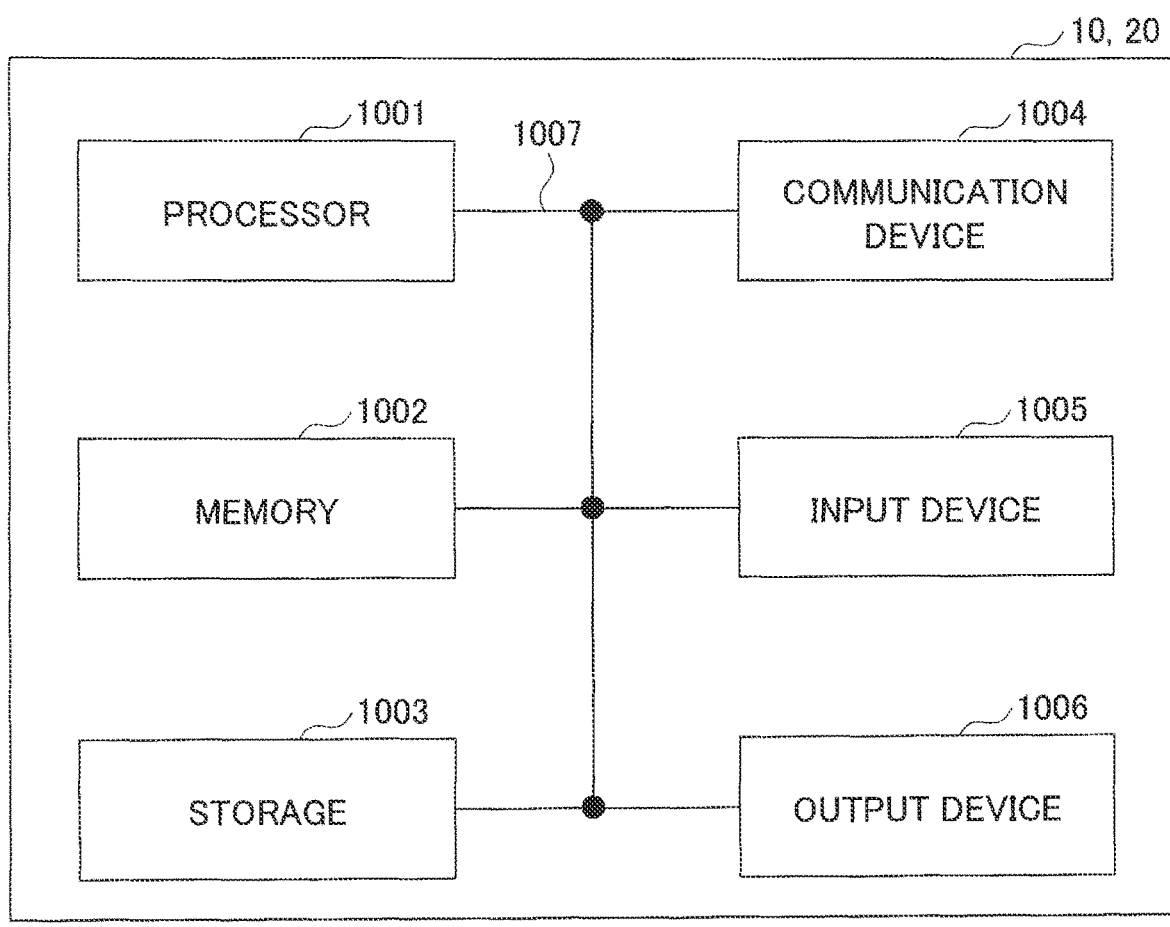
FIG. 13 is a diagram illustrating an example of a hardware configuration of the terminal and the base station.

For example, each of the terminal 10 and the base station 20 according to an embodiment of the present invention may function as a computer performing the process according to the embodiments. FIG. 13 is a diagram illustrating an example of a hardware configuration of the terminal 10 and the base station 20 according to the embodiments. Each of the above-described terminal 10 and base station 20 may be physically configured as a computer device including a processor 1001, a memory 1002, an storage 1003, a communication unit 1004, an input unit 1005, an output unit 1006, a bus 1007, and the like.

In the following description, the term "device" can be replaced with a circuit, a device, a unit, or the like. The hardware configuration of the terminal 10 and the base station 20 may include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication unit 1004, and reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and the like.

Additionally, the processor 1001 reads a program (program code), a software module, or data from the storage 1003 and/or the communication unit 1004 to the memory 1002, and executes various processes according to these. As the program, a program is used that causes a computer to execute at least a part of the operations described in the above-described embodiments. For example, the transmission unit 110, the reception unit 120, and the control unit 130 of the terminal 10 illustrated in FIG. 11 may be implemented by a control program that is stored in the memory 1002 and that is operated by the processor 1001. Furthermore, for example, the transmission unit 210, the reception unit 220, and the control unit 230 of the base station 20 illustrated in FIG. 12 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), a Random Access Memory (RAM), and the like. The memory 1002 may be referred to as a register, a cache, a main memory (main storage device), or the like. The memory 1002 may store a program (program code), a software module, or the like, which can be executed for implementing the process according to one embodiment of the present invention.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, and the like. The storage 1003 may be referred to as an auxiliary storage device. The above-described storage medium may be, for example, a database including the memory 1002 and/or the storage 1003, a server, or any other suitable medium.

The communication unit 1004 is hardware (transmitting and receiving device) for performing communication between computers through a wired network and/or a wireless network, and is also referred to, for example, as a network device, a network controller, a network card, a communication module, or the like. For example, the transmission unit 110 and the reception unit 120 of the terminal 10 may be implemented by the communication unit 1004. Furthermore, the transmission unit 210 and the reception unit 220 of the base station 20 may be implemented by the communication unit 1004.

The input unit 1005 is an input device (e.g., a keyboard, a mouse, a microphone, a switch, a button, and/or a sensor) that receives an external input. The output unit 1006 is an output device (e.g., a display, a speaker, and/or an LED lamp) that performs output toward outside. The input unit 1005 and the output unit 1006 may be configured to be integrated (e.g., a touch panel).

Each device, such as the processor 1001 and the memory 1002, is also connected by the bus 1007 for communicating information. The bus 1007 may be formed of a single bus or may be formed of different buses between devices.

The terminal 10 and the base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented by at least one of these hardware components.

Conclusion of the Embodiments

In the specification, at least the terminal and the base station described below are disclosed.

A terminal including a reception unit that receives a synchronization signal block in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a control unit that identifies, based on the received synchronization signal block, an index of a candidate position for a transmission corresponding to the received synchronization signal block, from among candidate positions for transmitting a synchronization signal block, the number of the candidate positions being greater than a predetermined number.

According to the above-described configuration, in the unlicensed band of the high frequency band higher than or equal to the second frequency band of the frequency range 2 in the NR system, for example, when the number of the candidate positions for a transmission of a synchronization signal block is greater than 64, the terminal can identify the index of the candidate position for the transmission of the synchronization signal block (the candidate position corresponds to the received synchronization signal block) based on the received synchronization signal block.

The control unit may determine that a half frame in which the synchronization signal block is to be transmitted is only a first half frame or only a latter half frame, and the control unit may identify a portion of information indicating the index of the candidate position for the transmission based on a value corresponding to the portion of the information indicating the index of the candidate position for the transmission, wherein the value is set in a field for transmitting a half frame index in the received synchronization signal block.

According to the above-described configuration, the portion of the information indicating the candidate position for the transmission of the synchronization signal can be transmitted by the half frame index.

The control unit may determine that a radio frame in which the synchronization signal block is to be transmitted is only a radio frame with an even system frame number or only a radio frame with an odd system frame number, and the control unit may identify a portion of information indicating the index of the candidate position for the transmission based on a value corresponding to the portion of the information indicating the index of the candidate position for the transmission, wherein the value is set in a field for transmitting a system frame number in the received synchronization signal block.

According to the above-described configuration, the part of the information indicating the index of the candidate position for the transmission of the synchronization signal can be transmitted by the system frame number.

The control unit may identify a portion of information indicating the index of the candidate position for the transmission based on a frequency resource used for a demodulation reference signal for a broadcast channel, wherein the broadcast channel is included in the received synchronization signal block.

According to the above-described configuration, the part of the information indicating the index of the candidate position for the transmission of the synchronization signal can be transmitted based on the frequency resource used for the demodulation reference signal for the broadcast channel included in the synchronization signal block.

A base station including a control unit that configures a synchronization signal block, the synchronization signal block including information for identifying an index of a candidate position for a transmission from among candidate positions for transmitting a synchronization signal block, the number of the candidate positions being greater than a predetermined number, wherein the synchronization signal block is to be transmitted in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a transmission unit that transmits the configured synchronization signal block.

According to the above-described configuration, in the unlicensed band of the high frequency band higher than or equal to the second frequency band of the frequency range 2 in the NR system, for example, when the number of the candidate positions for a transmission of a synchronization signal block is greater than 64, the terminal can identify the index of the candidate position for the transmission of the synchronization signal block (the candidate position corresponds to the received synchronization signal block) based on the received synchronization signal block.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the terminal 10 and the base station 20 are described using the functional block diagrams, but such devices may be implemented by hardware, software, or a combination thereof. Software executed by the processor included in the terminal 10 according to the embodiments of the present invention and software executed by the processor included in the base station 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present specification and may be provided by any other method. For example, the notification of information may be provided by physical layer signaling (for example, downlink control information (DCI) or uplink control information (UCI)), higher layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in the present specification may be reversed in order provided that there is no contradiction. For example, the method described in the present specification presents elements of various steps with an exemplary order and is not limited to a presented specific order.

In the present specification, a specific operation to be performed by the base station 20 may be performed by an upper node in some cases. In the network including one or more network nodes including the base station 20, various operations performed for communication with the terminal 10 can be obviously performed by the base station 20 and/or any network node (for example, an MME, an S-GW, or the like is considered, but it is not limited thereto) other than the base station 20. A case is exemplified above in which there is one network node other than the base station 20. The one network node may be a combination of a plurality of other network nodes (e.g., MME and S-GW).

The aspects/embodiments described in this specification may be used alone, in combination, or switched with implementation.

The terminal 10 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station 20 may be defined by those skilled in the art as a NodeB (NB), enhanced node B (eNB), base station, gNB, or several appropriate terminologies.

A bandwidth part (BWP: Bandwidth Part) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it is not be assumed that the UE transmits and receives a predetermined signal/channel outside an active BWP. Further, a "cell," a "carrier," or the like in the present disclosure may be replaced with a "BWP."

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology. The numerology may be a communication parameter applied to at least one of transmission and reception of a certain signal or channel. For example, the numerology may indicate at least one of a subcarrier spacing (SCS: SubCarrier Spacing), a bandwidth, a symbol length, a cyclic prefix length, a transmission time interval (TTI: Transmission Time Interval), a number of symbols per TTI, a radio frame configuration, a specific filtering process performed in the frequency domain by a transceiver, a specific windowing process performed in the time domain by a transceiver, and the like. The slot may include one or more symbols (Orthogonal Frequency Division Multiplexing (OFDM) symbols, Single Carrier Frequency Division Multiple Access (SC-FDMA) symbols, or the like) in the time domain. The slot may be a time unit based on the numerology. The slot may include a plurality of mini slots. Each mini slot may include one or more symbols in the time domain. Furthermore, the mini slot may be referred to as a sub-slot. The mini slot may include fewer symbols than a slot. A PDSCH (or PUSCH) transmitted in a unit of time greater than a mini slot may be referred to as a PDSCH (or PUSCH) mapping type A. A PDSCH (or PUSCH) transmitted using a mini slot may be referred to as a PDSCH (or PUSCH) mapping type B. Any one of a radio frame, a subframe, a slot, a mini slot, and a symbol indicates a time unit for transmitting a signal. As a radio frame, a subframe, a slot, a mini slot, and a symbol, different names corresponding to them may be used. For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of allocating a radio resource (a frequency bandwidth, a transmission power, or the like which can be used in each terminal 10) to each terminal 10 in units of TTIs. The definition of the TTI is not limited thereto. The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI. When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled. A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like. Furthermore, a long TTI (for example, a normal TTI, a subframe, or the like) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology. Furthermore, a time domain of an RB may include one or more symbols and may be a length of one slot, one mini slot, one subframe, or one TTI. One TTI, one subframe, or the like may be formed of one or more resource blocks. Furthermore, one or more RBs may be referred to as a physical resource block (PRB: Physical RB), a sub carrier group (SCG: Sub-Carrier Group), a resource element group (REG: Resource Element Group), a PRB pair, an RB pair, or the like. Furthermore, the resource block may be formed of one or more resource elements (RE: Resource Element). For example, one RE may be a radio resource region of one subcarrier and one symbol.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The description "based on" in this specification does not represent "only based on" unless otherwise stated. In other words, description of "based on" represents both "only based on" and "at least based on."

In this specification or the appended claims, in a case where "include," "including," and a modification thereof are used, these terms are intended as comprehensive terms similar to "comprising." In addition, a term "or" that is used in this specification and the appended claims is not intended as an exclusive OR.

In the entire present disclosure, for example, when an article such as "a," "an," and "the" in English is added by a translation, the article may include multiple things, unless the context explicitly indicates that the article does not include the multiple things.

Although the present invention is described above in detail, it is obvious to those skilled in the art that the present invention is not limited to the embodiments described in the specification. The present invention may be implemented as revised and modified embodiments without departing from the gist and scope of the present invention as set forth in claims.

Accordingly, the description of the specification is for the purpose of illustration and does not have any restrictive meaning to the present invention.

LIST OF REFERENCE SYMBOLS 10 terminal
110 transmission unit
120 reception unit
130 control unit
20 base station
210 transmission unit
220 reception unit
230 control unit
1001 processor
1002 memory
1003 storage
1004 communication device
1005 input device
1006 output device

The invention claimed is:
1. A terminal comprising:
a receiver that receives a synchronization signal block in an unlicensed band of a high frequency band higher than or equal to a frequency band of a frequency range

2 (FR2), the FR2 being in a range including a frequency range 1 (FR1) that is a low frequency band and the FR2 that is a high frequency band in a new radio (NR) system; and a processor that identifies, based on the received synchronization signal block, an index of a candidate position for a transmission corresponding to the received synchronization signal block, from among candidate positions for transmitting a synchronization signal block, the number of the candidate positions being greater than a predetermined number, wherein the processor determines that a radio frame in which the synchronization signal block is to be transmitted is only a radio frame with an even system frame number or only a radio frame with an odd system frame number, and identifies a portion of information indicating the index of the candidate position for the transmission based on a value corresponding to the portion of the information indicating the index of the candidate position for the transmission, the value being set in a field assumed to be used for notifying a system frame number of a radio frame in which the synchronization signal block is to be received.

2. The terminal according to claim 1, wherein the processor determines that a half frame in which the synchronization signal block is to be transmitted is only a first half frame or only a latter half frame, and identifies a portion of information indicating the index of the candidate position for the transmission based on a value corresponding to the portion of the information indicating the index of the candidate position for the transmission, the value being set in a field assumed to be used for notifying an index of a half frame in which the synchronization signal block is to be received.

3. The terminal according to claim 1, wherein the processor identifies a portion of information indicating the index of the candidate position for the transmission based on a frequency resource used for a demodulation reference signal for a broadcast channel, the broadcast channel being included in the received synchronization signal block.

4. A base station comprising:

a processor that configures a synchronization signal block, the synchronization signal block including information for identifying an index of a candidate position for a transmission from among candidate positions for transmitting a synchronization signal block, the number of the candidate positions being greater than a predetermined number, wherein the synchronization signal block is to be transmitted in an unlicensed band of a high frequency band higher than or equal to a frequency band of a frequency range 2 (FR2), the FR2 being in a range including a frequency range 1 (FR1) that is a low frequency band and the FR2 that is a high frequency band in a new radio (NR) system; and a transmitter that transmits the configured synchronization signal block, wherein the processor determines that a radio frame in which the synchronization signal block is to be transmitted is only a radio frame with an even system frame number or only a radio frame with an odd system frame number, and the transmitter transmits a portion of information indicating the index of the candidate position for the transmission based on a value corresponding to the portion of the information indicating the index of the candidate position for the transmission, the value being set in a field assumed to be used for notifying a system frame number of a radio frame in which the synchronization signal block is to be transmitted.

* * * * *